US011288575B2

(12) United States Patent
Tomioka et al.

(10) Patent No.: US 11,288,575 B2
(45) Date of Patent: Mar. 29, 2022

(54) ASYNCHRONOUS NEURAL NETWORK TRAINING

(71) Applicant: Microsoft Technology Licensing, LLC, Redmond, WA (US)

(72) Inventors: Ryota Tomioka, Cambridge (GB); Matthew Alastair Johnson, Cambridge (GB); Daniel Stefan Tarlow, Cambridge (GB); Samuel Alexander Webster, Cambridge (GB); Dimitrios Vytiniotis, Cambridge (GB); Alexander Lloyd Gaunt, Cambridge (GB); Maik Riechert, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1162 days.

(21) Appl. No.: 15/599,058

(22) Filed: May 18, 2017

(65) Prior Publication Data

US 2018/0336458 A1 Nov. 22, 2018

(51) Int. Cl.
*G06N 3/08* (2006.01)
*G06N 3/04* (2006.01)
*G06N 3/063* (2006.01)

(52) U.S. Cl.
CPC .............. *G06N 3/08* (2013.01); *G06N 3/04* (2013.01); *G06N 3/063* (2013.01)

(58) Field of Classification Search
CPC ............. G06N 3/04; G06N 3/063; G06N 3/08
See application file for complete search history.

(56) References Cited

U.S. PATENT DOCUMENTS

| 5,812,992 | A | 9/1998 | de Vries | |
|---|---|---|---|---|
| 7,496,546 | B2 | 2/2009 | Hoya | |
| 8,131,659 | B2 | 3/2012 | Xu et al. | |
| 2015/0324690 | A1* | 11/2015 | Chilimbi | G06N 3/08 706/25 |
| 2015/0371132 | A1 | 12/2015 | Gemello et al. | |
| 2016/0103901 | A1 | 4/2016 | Kadav et al. | |
| 2016/0132787 | A1* | 5/2016 | Drevo | G06N 20/10 706/12 |
| 2016/0196480 | A1* | 7/2016 | Heifets | G06N 3/088 382/158 |
| 2016/0267380 | A1 | 9/2016 | Gemello et al. | |

(Continued)

OTHER PUBLICATIONS

Czarnecki, et al., "Understanding Synthetic Gradients and Decoupled Neural Interfaces", Retrieved From: https://arxiv.org/pdf/1703.00522.pdf, Mar. 1, 2017, 15 Pages.

(Continued)

*Primary Examiner* — Omar F Fernandez Rivas
*Assistant Examiner* — Selene A. Haedi

(57) ABSTRACT

A neural network training apparatus is described which has a network of worker nodes each having a memory storing a subgraph of a neural network to be trained. The apparatus has a control node connected to the network of worker nodes. The control node is configured to send training data instances into the network to trigger parallelized message passing operations which implement a training algorithm which trains the neural network. At least some of the message passing operations asynchronously update parameters of individual subgraphs of the neural network at the individual worker nodes.

20 Claims, 11 Drawing Sheets

(56) References Cited

U.S. PATENT DOCUMENTS

| | | | |
|---|---|---|---|
| 2016/0321777 A1 | 11/2016 | Jin et al. | |
| 2017/0132513 A1* | 5/2017 | Yu | G06N 3/08 |
| 2017/0161635 A1* | 6/2017 | Oono | G06N 3/084 |
| 2017/0185895 A1* | 6/2017 | Chen | G06N 3/0454 |
| 2018/0060723 A1* | 3/2018 | Nakano | G06T 7/0012 |
| 2018/0077180 A1* | 3/2018 | Zhang | G06F 21/566 |
| 2018/0293492 A1* | 10/2018 | Kalamkar | G06N 3/0445 |
| 2018/0314971 A1* | 11/2018 | Chen | G06N 20/20 |

OTHER PUBLICATIONS

Gaunt, et al., "AMPNet: Asynchronous Model-Parallel Training for Dynamic Neural Networks", Retrieved From https://arxiv.org/pdf/1705.09786.pdf, Jun. 22, 2017, 18 Pages.

"International Search Report and Written Opinion issued in PCT Application No. PCT/US18/028762", dated Aug. 3, 2018, 14 Pages.

Looks, et al., "Deep Learning with Dynamic Computation Graphs", In proceedings of 5th International Conference on Learning Representations, Feb. 7, 2017, pp. 1-12.

Gunther, et al., "Neuralnet: Training of Neural Networks", In The R journal, vol. 2, No. 1, Jun. 2010, pp. 30-38.

Fukumizu, Kenji, "Dynamics of Batch Learning in Multilayer Neural Networks", In Proceedings of the 8th International Conference on Artificial Neural Networks, Sep. 2, 1998, pp. 1-6.

Miconi, Thomas, "Training recurrent neural networks with sparse, delayed rewards for flexible decision tasks", https://arxiv.org/abs/1507.08973, Published on: Jul. 31, 2015, 12 pages.

Dean, et al., "Large Scale Distributed Deep Network", In Proceedings of the 25th International Conference on Neural Information Processing Systems, Dec. 3, 2012, pp. 1-9.

Chilimbi, et al., "Project Adam: building an efficient and scalable deep learning training system", In Proceedings of the 11th USENIX conference on Operating Systems Design and Implementation, Oct. 6, 2014, pp. 571-582.

Chen, et al., "Pipelined Back-Propagation for Context-Dependent Deep Neural Networks", In Proceedings of 13th Annual Conference of the International Speech Communication Association, Sep. 9, 2012, 4 pages.

Ovtcharov et al., "Accelerating Deep Convolutional Neural Networks Using Specialized Hardware", In Publication of Microsoft Research Whitepaper, vol. 2, Issue 11, Feb. 23, 2015, pp. 1-4.

Caulfield, et al., "A Cloud-Scale Acceleration Architecture", In Proceedings of 49th Annual IEEE/ACM International Symposium on Microarchitecture, Oct. 15, 2016, 13 pages.

Abadi, et al., "TensorFlow: Large-Scale Machine Learning on Heterogeneous Distributed Systems", In Journal of Computing Research Repository, Mar. 2016, pp. 1-19.

Bowman, et al., "A Fast Unified Model for Parsing and Sentence Understanding", In Journal of Computing Research Repository, Mar. 2016, 11 pages.

Chung, et al., "Empirical evaluation of gated recurrent neural networks on sequence modeling", In Journal of Computing Research Repository, Dec. 2014, pp. 1-9.

Goller, et al., "Learning task-dependent distributed representations by backpropagation through structure", In Proceedings of IEEE International Conference on Neural Networks, Jun. 3, 1996, pp. 1-12.

Jaderberg, et al., "Decoupled Neural Interfaces Using Synthetic Gradients", In Journal of Computing Research Repository, Aug. 2016, pp. 1-16.

Li, et al., "Gated graph sequence neural networks", In Journal of Computing Research Repository, Nov. 2015, pp. 1-20.

Looks, et al., "Deep learning with dynamic computation graphs", In Journal of Computing Research Repository, Feb. 2017, pp. 1-12.

Mitliagkas, et al., "Asynchrony begets momentum, with an application to deep learnin", In Journal of Computing Research Repository, May 2016, pp. 1-10.

Neubig, et al., "DyNet: The Dynamic Neural Network Toolkit", In Journal of Computing Research Repository, Jan. 2017, pp. 1-33.

"PyTorch", http://pytorch.org/, Retrieved on: Mar. 15, 2017, 4 pages.

Socher, et al., "Parsing natural scenes and natural language with recursive neural networks", In Proceedings of the 28th international conference on machine learning, Jun. 28, 2011, 8 pages.

Tai, et al., "Improved semantic representations from tree-structured long short-term memory networks", In Journal of Computing Research Repository, Mar. 2015, 11 pages.

Tokui, et al., "Chainer: A next-generation open source framework for deep learning", In Proceedings of NIPS Workshop on Machine Learning Systems, Dec. 12, 2015, pp. 1-6.

Niu, et al., "Hogwildi: A Lock-Free Approach to Parallelizing Stochastic Gradient Descent", In Proceedings of 25th Annual Conference on Neural Information Processing Systems, Dec. 12, 2011, pp. 1-9.

"Office Action Issued in European Patent Application No. 18725354.7", dated May 20, 2021, 9 Pages.

* cited by examiner

ASYNCHRONOUS NEURAL NETWORK TRAINING

BACKGROUND

Neural networks are increasingly used for classification and regression tasks in a wide variety of application domains such as object recognition, lip reading, speech recognition, detecting anomalous transactions, text prediction, and many others. Typically the quality of performance of the neural network depends on how well it has been trained and the amount of training data available.

The training process for neural networks generally involves using a training algorithm such as backpropagation to update parameters of the neural network in an iterative process. The iterative process is time consuming and computationally expensive since the number of parameters to be updated is huge (in the case of deep neural networks) and the amount of training data is also huge. In order to cope with the demands of the training process, graphics processing units are typically used to speed up neural network training and training data instances are typically batched together so that a batch is consumed in each training iteration. In this way the training time is reduced to some extent although even so, it generally involves days or hours of offline training before the neural network is available for use.

The embodiments described below are not limited to implementations which solve any or all of the disadvantages of known neural network training systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A neural network training apparatus is described which has a network of worker nodes each having a memory storing a subgraph of a neural network to be trained. The apparatus has a control node connected to the network of worker nodes. The control node is configured to send training data instances into the network to trigger parallelized message passing operations which implement a training algorithm which trains the neural network. At least some of the message passing operations asynchronously update parameters of individual subgraphs of the neural network at the individual worker nodes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
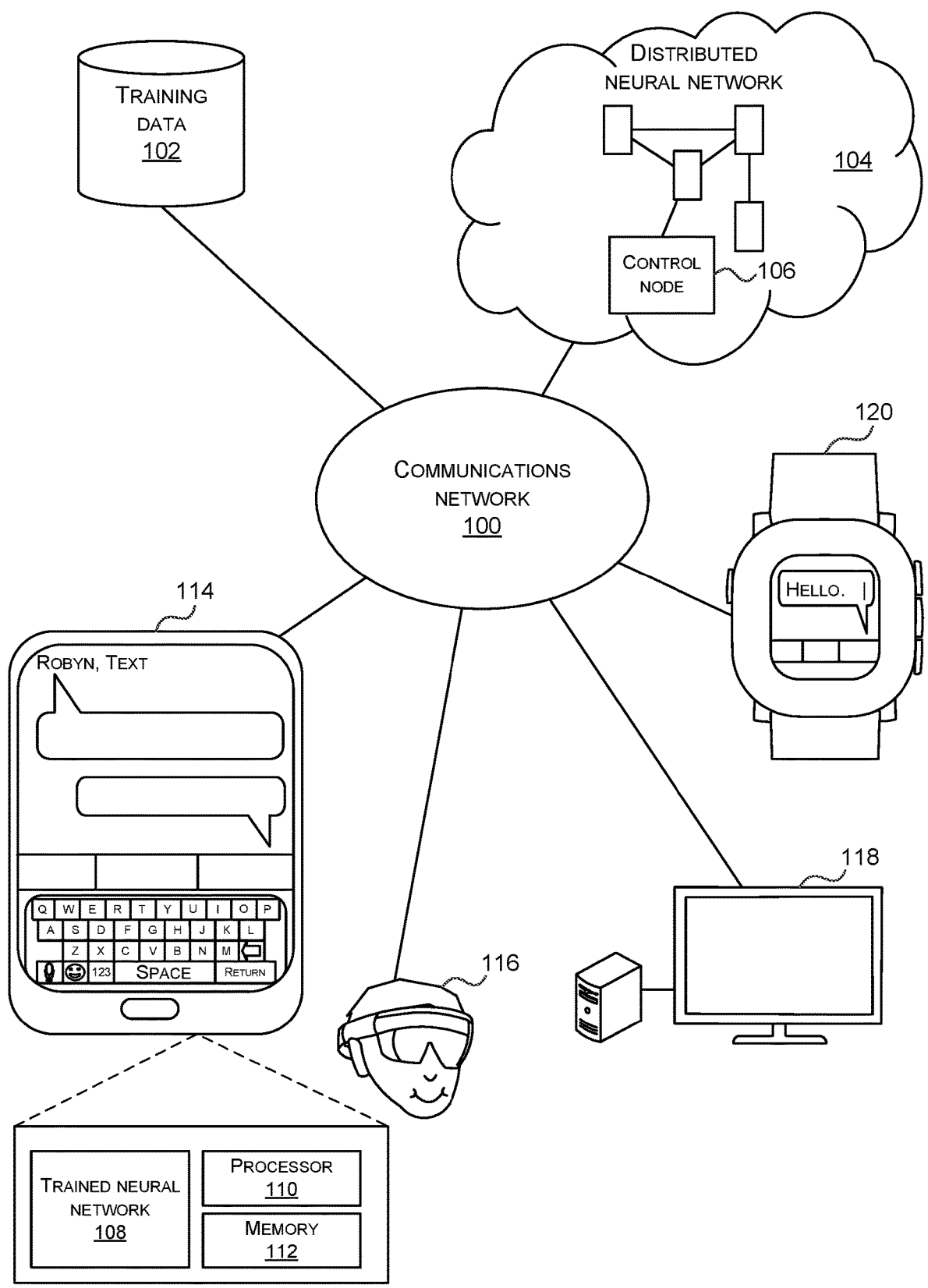
FIG. 1 is a schematic diagram of a distributed neural network at a neural network training system connected to a communications network.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

A neural network is a collection of nodes interconnected by edges and where there are weights associated with the nodes and/or edges. A non-linear function is commonly applied in each node to produce its activation and a non-exhaustive list of non-linear functions which may be used is: sigmoid, tan h, rectifier. During a training phase the weights are updated according to update rules in the light of training examples. The units comprise input units, hidden units and output units. Input units are units at which input is made to the neural network, hidden units are connected between input units and output units (or other hidden units in the case of deep networks), and output units are units at which output from the neural network is observed. A neural network may have a layered construction with a layer of input nodes, one or more layers of hidden units and at least one output layer. During use of the neural network at test time (i.e. after training) as a signal passes through a layer it produces an output via the activations which becomes the input to the next layer of the neural network and so on, until the signal reaches the output layer and the output units are activated. The pattern of activations at the output layer gives the prediction of the neural network. The pattern of activations has been influenced by the weights learnt during the training phase.

Neural networks are typically trained using a back propagation algorithm. A back propagation algorithm comprises inputting a labeled training data instance to a neural network, propagating the training instance through the neural network (referred to as forward propagation or a forward pass) and observing the output. The training data instance is labeled and so the ground truth output of the neural network is known and the difference or error between the observed output and the ground truth output is found and provides information about a loss function which is passed back through the neural network layers in a backward propagation or backwards pass. A search is made to try find a minimum of the loss function which is a set of weights of the neural network that enable the output of the neural network to match the ground truth data. Searching the loss function is achieved using gradient descent or stochastic gradient descent or in other ways and as part of this process gradients are computed as described herein. The gradient data is used to update weights of the neural network. In various examples described herein the forward and back propagation is implemented using message passing between worker nodes of a network of worker nodes and the weights of the neural network are examples of parameters of the neural network.

As mentioned above neural network training is computationally expensive and highly resource intensive. Graphics processing units are typically used to speed up the training process and batches of training instances are used for each training iteration. However, the use of graphics processing units is not suitable for neural network architectures where the control flow is different for different individual training data instances. Such types of neural network are used for applications where the input data comprises structure which is useful for making predictions. For example, in the case where an input data instance is a graphical representation of an organic molecule with rings of bonded atoms it is desirable to use a neural network which takes the graphical representation as input (as opposed to flattening the graphical representation into a flat series of numerical values for input to a traditional neural network). Neural networks which take graphical representations as input in this manner are known and the control flow (path the input data instance takes through the network architecture) is different for each input data instance as each input data instance has a different graphical structure. It is recognized herein that training these types of neural network is especially resource intensive for a number of reasons. Because of the different control flow path it is not possible to effectively exploit speed ups provided by graphics processing units in the same way as it is for conventional neural networks where the control flow path is the same for each input instance. Also, because each training data instance has a different form it is not straightforward to batch the training data instances during the training process. Previous approaches have attempted to flatten the training data instances and use padding to make each training data instance have the same form so that batching is possible. However, doing the flattening and padding is complex and also it hides underlying structure in the training data so that the training data is less effective. In various examples described herein, a neural network is trained without the need for padding of training data instances. In various examples described herein, a neural network is trained for cases where the neural network has different control flow paths for different input instances. However, the examples described herein are also applicable to cases where the neural network has the same control flow path for each input instance. In various examples described herein fast, parallelized training of neural networks is achieved without the need for graphics processing units.

In order to deal with neural network architectures where the control flow path is different for different input data instances, various examples described herein use a graphical representation of a neural network which includes constructs for branches, loops and other neural network architecture features. However, it is not essential to use this type of neural network graphical representation.

As mentioned above, neural network training is typically carried out offline. Once neural network training is complete the parameters of the neural network are stored and may be transferred from the training system to devices where the neural network will be deployed, such as a smart phone, an augmented reality computing device, a smart watch or others. Offline training brings disadvantages including that the neural network cannot be used whilst it is being trained. Also, the neural network, once trained, quickly becomes out of date if new training instances become available and are not used for training. In various examples described herein, training is carried out online so that the neural network is available for use at any time and so that it is continually up to date.

In various examples described herein a distributed neural network training system is used comprising a plurality of worker nodes in communication with one another via a communications network. A neural network is distributed over the worker nodes so that model parallelism is implemented whereby individual ones of the worker nodes hold subsets of the neural network model. Where the neural network is represented as a graph the subsets are referred to as subgraphs. The neural network is partitioned or divided between the worker nodes. That is, an individual worker node has some but not all of the neural network graph and it is not essential to have a control node or global store holding a copy of the complete neural network. Because an individual worker node has only a subgraph of the neural network it only has a subset of the parameters of the neural network which are part of the subgraph. In various examples described herein, the neural network is partitioned over the worker nodes according to neural network layers, such that a whole individual layer of a neural network is held on a single worker node. However, it is not essential to partition the neural network by whole layers as in some cases a partition comprises part but not all of a layer of a neural network.

In various examples described herein model parallelism is combined with asynchronous updates of the neural network subgraph parameters at the individual worker nodes. This scheme is found to give extremely good efficiency (as explained with reference to FIG. 9 below) and is found empirically to work well in practice despite the fact that the conventional theoretical convergence guarantee for stochastic gradient descent would not apply to the asynchronous updates of the subgraph parameters.

In various examples described herein the distributed neural network training system comprises a network of worker nodes. The network comprises a pipeline is some cases but this is not essential. A pipeline is a plurality of computational worker nodes connected in series and where a plurality of data instances may be in fight in the pipeline concurrently. For example, a neural network training data instance which has been processed by a first worker node of the pipeline is passed to a second worker node of the pipeline. A second training data instance is injected into the pipeline and is processed by the first worker node of the pipeline concurrently with processing of the first training data instance by the second worker node of the pipeline. In this way each of the worker nodes of the pipeline is able to work whilst the other worker nodes of the pipeline are concurrently working.

In various examples described herein, worker nodes of the distributed neural network training system are deployed with fast memory which holds the subgraph partition of the neural network stored at the individual worker node. In an example the fast memory is accessible at generally the same speed as that of the floating point arithmetic operations of the neural network training process. In an example, the fast memory is on-chip memory. However, it is not essential to use fast memory.

FIG. 1 is a schematic diagram of a distributed neural network training system 104 comprising a plurality of computational nodes (referred to as worker nodes) which are in communication with one another and with a control node 106. The distributed neural network training system 104 has access to training data 102 which comprises labeled training data instances such as images, graphical representations of molecules, speech signals, text, sensor data, knowledge graphs, and others.

In some examples the training data 102 and the distributed neural network 104 are connected to a communications network 100 such as the internet, an intranet or any other communications network. The distributed neural network training system 104 acts as a cloud service in some cases either for training, or for test time use of the neural network, or for a combination of online training and test time use. Test time use of the neural network means using the neural network to process an input data instance and compute a prediction, where the input data instance has not previously been available to the neural network. In some cases, the distributed neural network training system 104 is used to train a neural network and the learnt parameters of the neural network are then extracted, optionally compressed, and deployed at one or more other computing devices such as smart phone 114, augmented reality computing device 116, laptop computer 118, smart watch 120 or others. FIG. 1 shows smart phone 114 as comprising a trained neural network 108 which has been trained using the distributed neural network training system 104 as well as a processor 110 and memory 112 amongst other components which are not illustrated.

Figure 2:
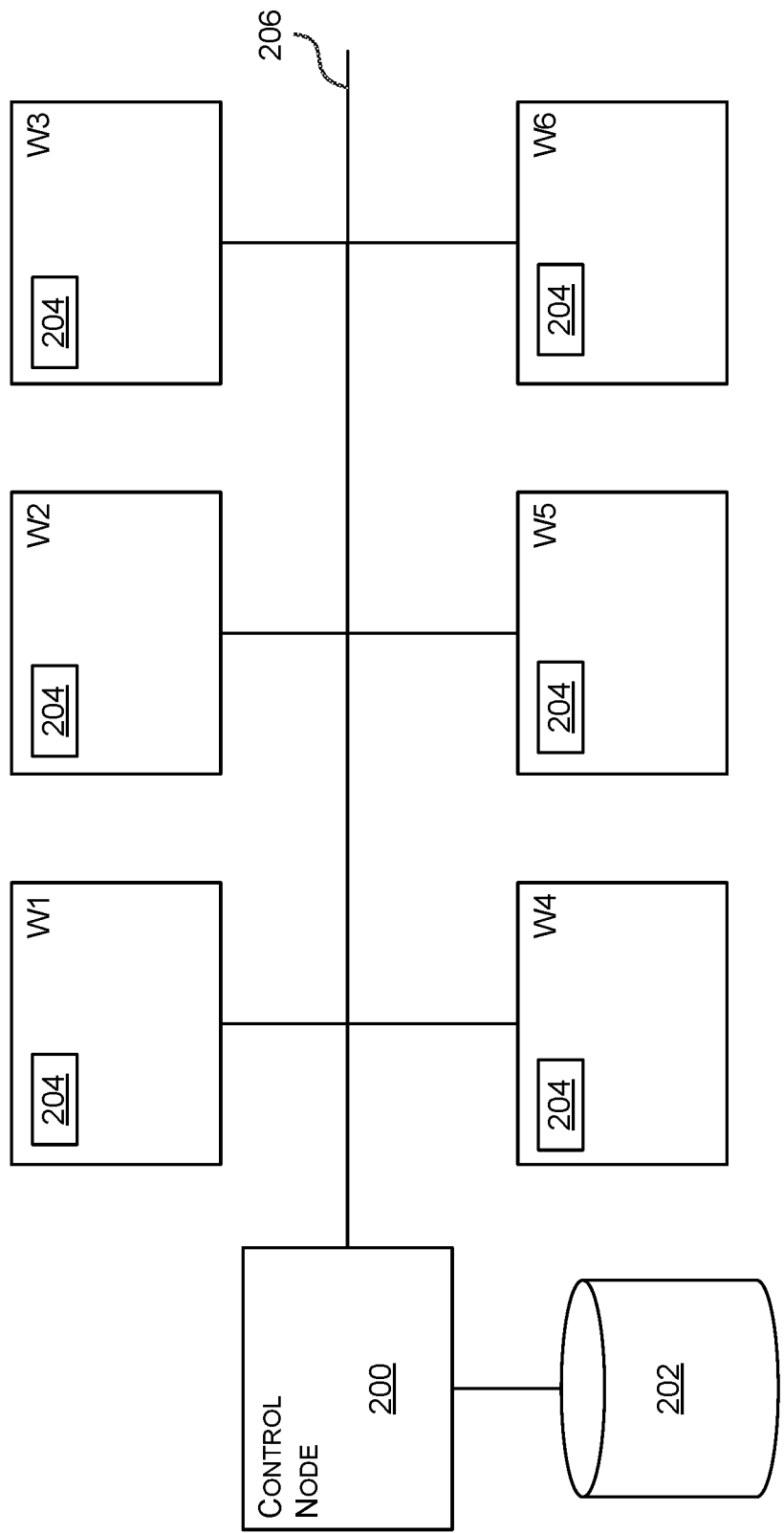
FIG. 2 is a schematic diagram of a plurality of worker nodes and a control node of a neural network training system.

FIG. 2 is a schematic diagram of an example of the distributed neural network training system 104 of FIG. 1 in more detail. A control node 200 is connected to a plurality of worker nodes 204 using a communications network 206. The worker nodes 204 are configured to act as a dynamic pipeline and this is indicated in FIG. 2 by the numbering of the worker nodes w1 through w6 where the numerical order reflects the in-series ordering of the worker nodes in the pipeline for a particular training/test instance. Note that in general the pipeline is dynamic to enable different control flow for individual training or test instances; workers can be reordered, bypassed or used multiple times as dictated by the structure of the instance. Although the communications network 206 is illustrated as connecting each worker node to each other worker node this is not essential; any connection pattern may be used which enables a dynamic pipeline to be formed from the worker nodes 204.

In the example of FIG. 2 each individual worker node has fast memory 204 and the control node 200 has access to a store of training data 202. The control node sends messages comprising data into the pipeline and these messages trigger message passing operations. A message passing operation is a computation which occurs at a neural network node using data in one or more messages received at the worker node and instructions for the computation which are available at the neural network node. The results of the computation are stored at the neural network node or sent to other neural network node(s) of the graph in another message passing operation. In the present technology the computations are instructions which implement functionality of a subgraph of the neural network which is stored at a worker node, and the data is either training or test examples from the control node, or results of computations on the training or test examples from a worker node. In the present technology the message passing operations implement a neural network training algorithm such as backpropagation.

Figure 3:
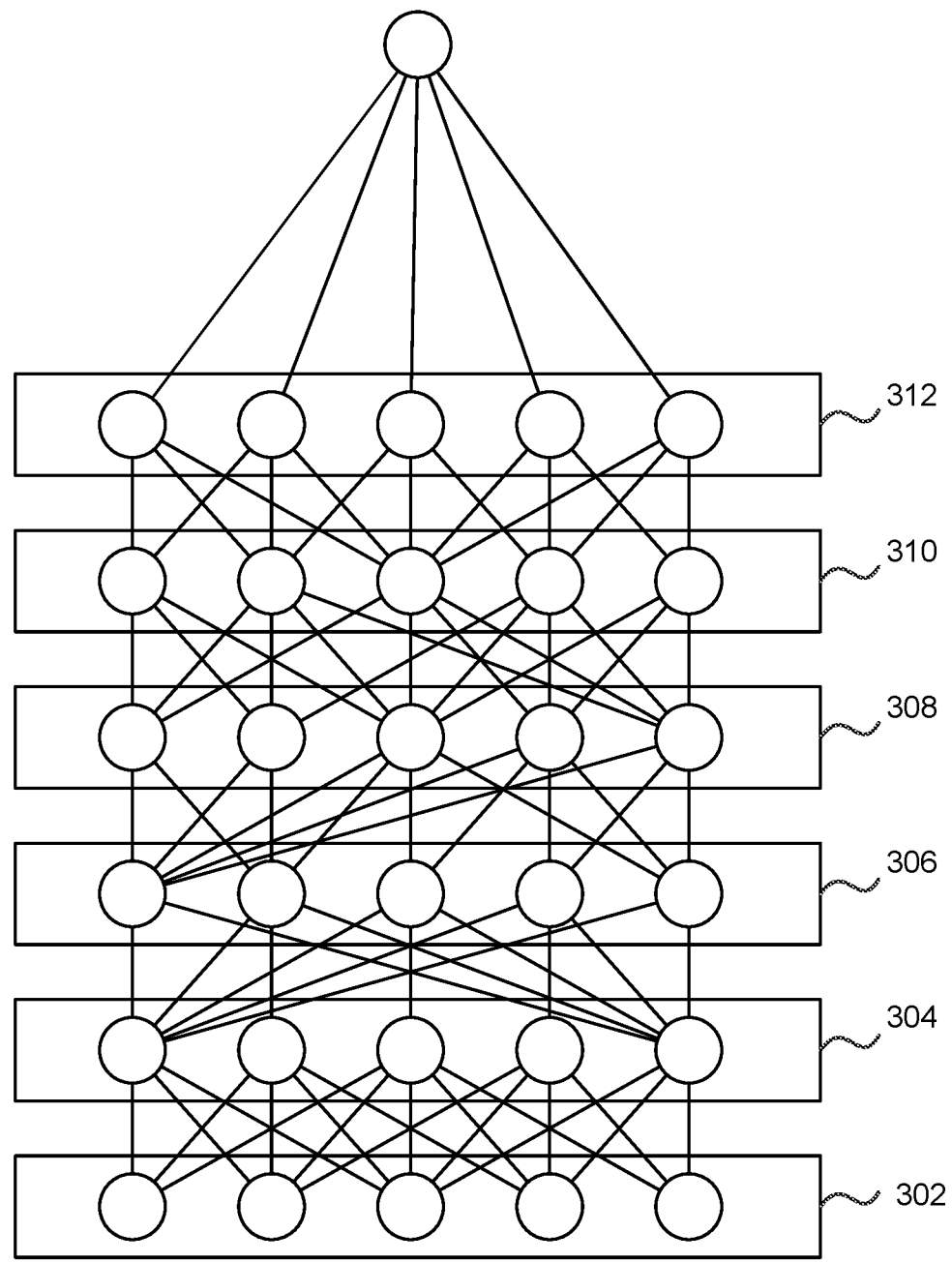
FIG. 3 is a schematic diagram of a neural network.

FIG. 3 is a schematic diagram of a neural network comprising a plurality of interconnected layers 302, 304, 306, 308, 310, 312 of nodes. In this example each layer has the same number of neural network nodes however, different numbers of neural network nodes per layer, different numbers of layers and different interconnection patterns may be used; that is other types of neural network architecture are possible. The example of FIG. 3 is given to illustrate how each layer of the neural network may be partitioned and stored on an individual worker node, optionally in fast memory of the worker node.

Figure 4:
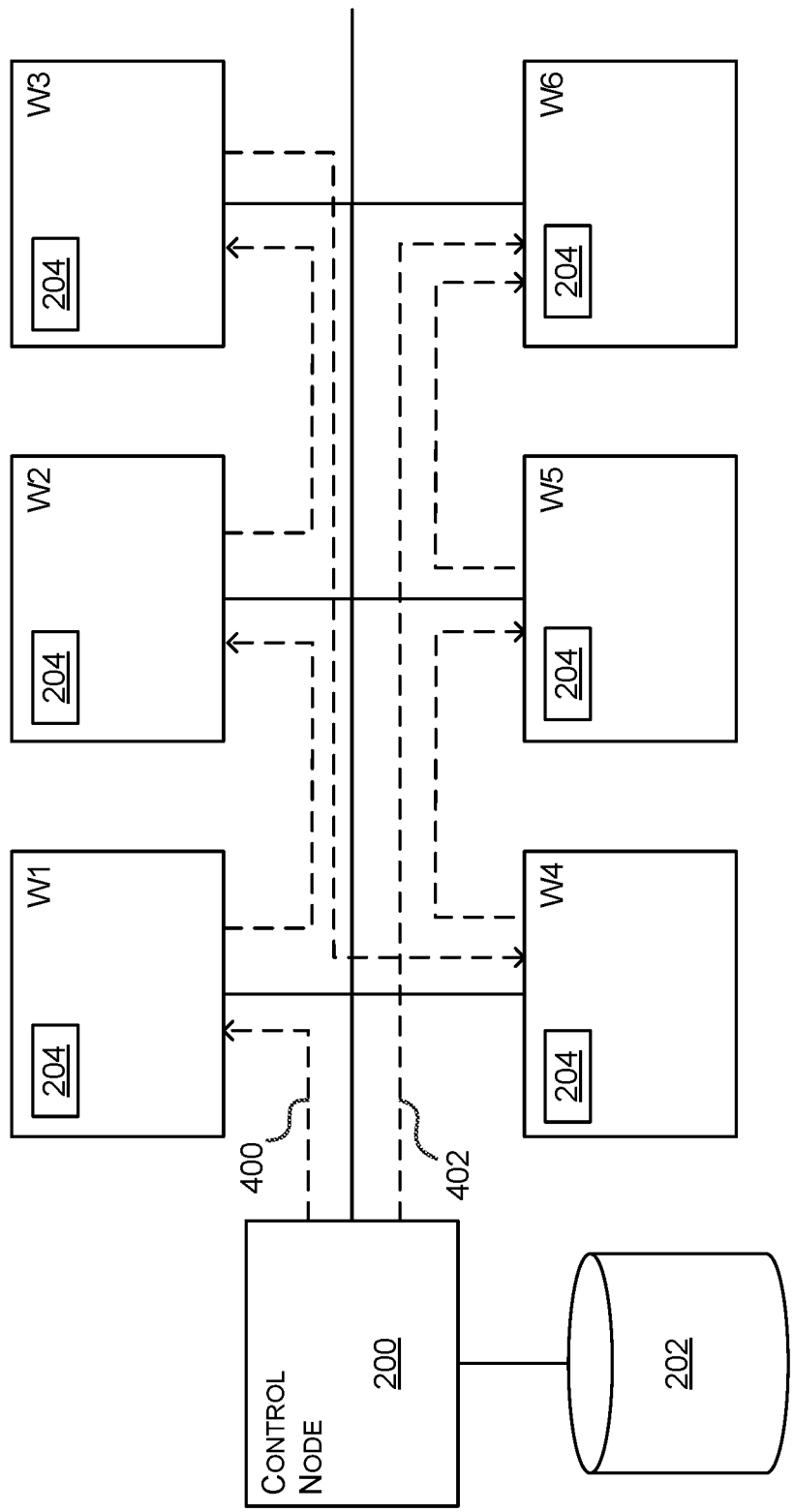
FIG. 4 is a schematic diagram of the neural network training system of FIG. 2 and showing paths of a forward process.

In various examples herein the pipelined architecture of the distributed neural network training system is configured to operate a forward process and also a backward process. The forward and backward processes are now described separately for ease of understanding, although in practice these processes may operate concurrently. FIG. 4 illustrates the forward process which is used either for training or for test time processing. The pipeline may have more than one data instance in flight at any one time and it is possible for an individual data instance to be undergoing the forward process for training and another in flight data instance to be undergoing the forward process for test time concurrently. In this way the distributed neural network training system 104 provides online training which enables the neural network to be continually up to date, and available for use at any time.

FIG. 4 illustrates control node 200 sending a data instance in a message along path 400 to the first worker node of the pipeline. The first worker node of the pipeline processes the data instance and sends the results to the second worker node of the pipeline. The second worker node of the pipeline processes the data it receives from the first worker node and passes the results it computes to the third worker node in the pipeline and so on until the final worker node in the pipeline processes the data it receives from the penultimate worker node in the pipeline. The final worker node computes a prediction. The processing that each worker node does in the forward process comprises passing the data received at the worker node through the subgraph of the neural network which is stored locally at the worker node itself (in the fast memory 204 for example). This computation comprises applying parameterized or non-parameterized transformations of the neural network nodes of the subgraph to the data. In the case of parameterized transformation the locally stored values of the parameters of the nodes are used. Because the parameters for the computation are available at the worker node itself the computation proceeds efficiently without the need to obtain parameters from other worker nodes. The results of the computations (activations) are passed between the worker nodes in messages and in some examples the messages comprise a flag which indicates whether the data is a training instance or a test instance. At the final node in the pipeline, the flag is inspected and if the flag indicates a training data instance the worker node accesses a label which it has already received from the control node 200 for the training data instance. (The control node sends the label to the final node at the same time it sends out the input to the first worker node.) The worker node then computes a loss (related to a comparison of the prediction computed from the forward process and the label, such as a softmax cross entropy loss, a mean squared loss function, or other loss function) and, if the flag has indicated a training instance, triggers a backward process to begin as described later in this document. If the flag indicates a test instance the worker node outputs the prediction computed from the forward process. If the flag indicates a validation instance no backward process is triggered but a process for measuring performance of the system is triggered such as for tuning hyper-parameters.

The example of FIG. 4 shows only one data instance being propagated through the pipeline for clarity. However, in practice many data instances are in flight in the pipeline since once the first worker node has processed the first data instance it is able to begin on a second data instance immediately and so on.

Figure 5:
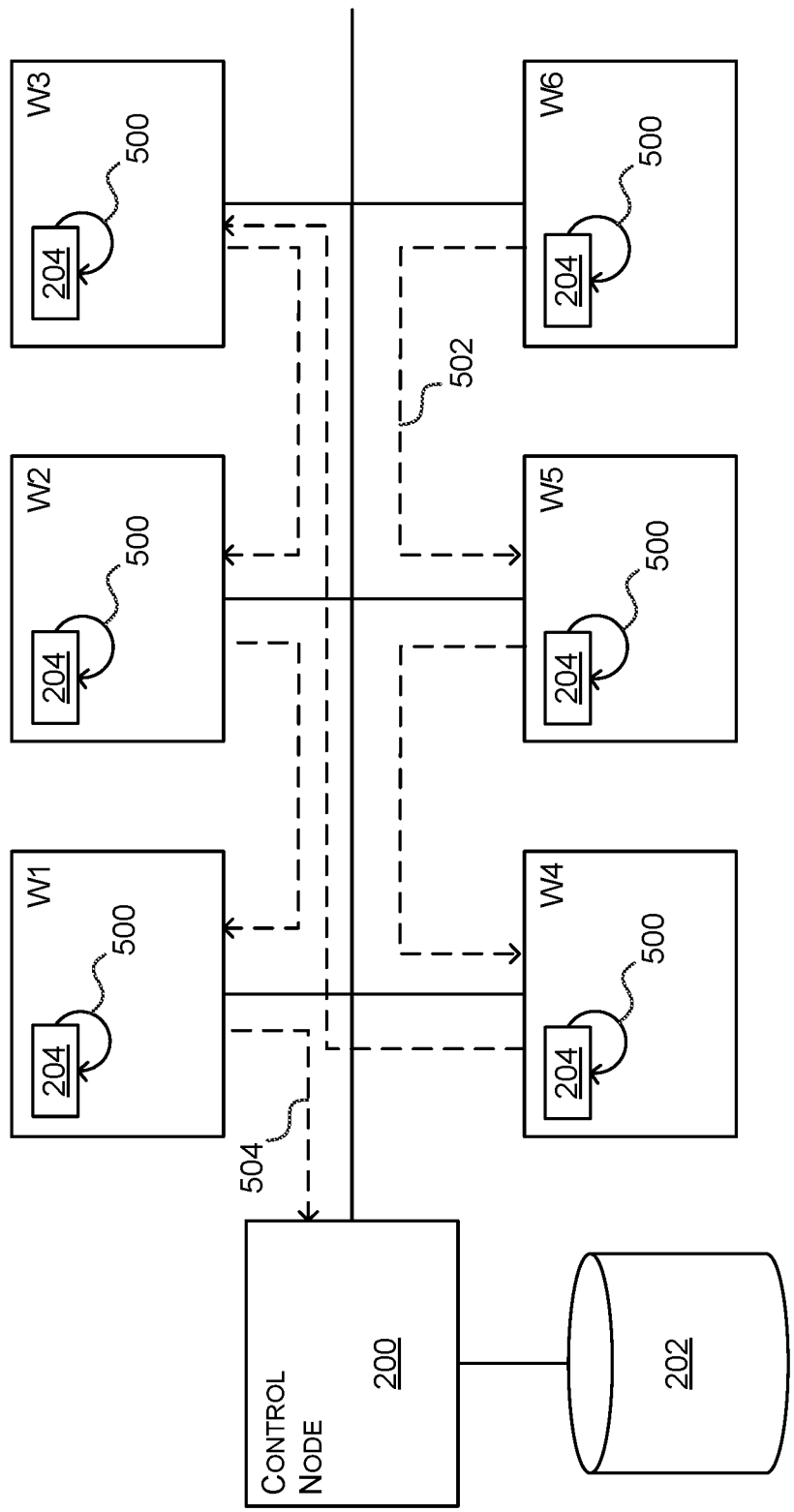
FIG. 5 is a schematic diagram of the neural network training system of FIG. 2 and showing paths of a backward process.

FIG. 5 shows the pipeline of FIG. 4 in the backward process. The final worker node has computed a loss which comprises computing one or more gradients of a loss function comparing the label and prediction at the final worker node. The computed gradients are used to update the parameter values of the neural network subgraph stored at the final worker node and this is illustrated by arrow 500 in FIG. 5 at worker node w6.

The update of the parameter values at the final worker node occurs asynchronously, that is, without reference to, and independently of, other updates to parameter values of the neural network at others of the worker nodes. Asynchronous updates of the parameter values are also made at the other worker nodes as explained in more detail below. By using asynchronous updates in this manner huge efficiencies are gained since the pipeline may be exploited to its full extent as described later with reference to FIG. 9. In this manner, neural network training is achieved in a practical manner even for very large neural networks and huge amounts of training data and without the need for graphics processing units or their equivalents.

In some examples, efficiencies are also gained by accumulating gradients at an individual worker node and carrying out the update to the subgraph parameters when the number of accumulated gradients meets criteria. This enables the frequency of updates to be controlled according to the criteria and in some cases the control node 200 dynamically adjusts either a global value of the criteria or per-worker node values of the criteria. The control node dynamically adjusts the criteria according to one or more factors. A non-exhaustive list of examples of factors is: number of accumulated gradients, neural network architecture type, data instance features, observed worker node performance factors, observed communications network performance, subgraph factors, and others. Dynamic adjustment of the criteria gives improved efficiency of the pipeline. Dynamic adjustment of the criteria also leads to more accurate neural network processing in some cases since the frequency of updates is controlled.

The values computed by the final worker node of the pipeline are sent from the final worker node to the penultimate worker node w5 along path 502 as illustrated in FIG. 5. The penultimate worker node then computes parameter gradients and backward messages to be propagates to the immediately preceding worker node. Each gradient describes the direction in which the corresponding parameter should be moved to maximally reduce the loss function. The penultimate worker node accumulates the gradients or updates the values of the parameters of the subgraph in fast memory 204 at the penultimate worker node. The penultimate worker node sends the values it computed to the immediately preceding worker node of the pipeline which is w4 in this case and the process repeats until worker node 1 is reached. Worker node 1 carries out the same process and sends a message 504 to the control node to indicate that the backward process is complete. The control node updates a record of the number of in flight data instances.

FIG. 5 shows only one message flow for clarity although in practice many message flows are in the pipeline as described above.

Figure 6:
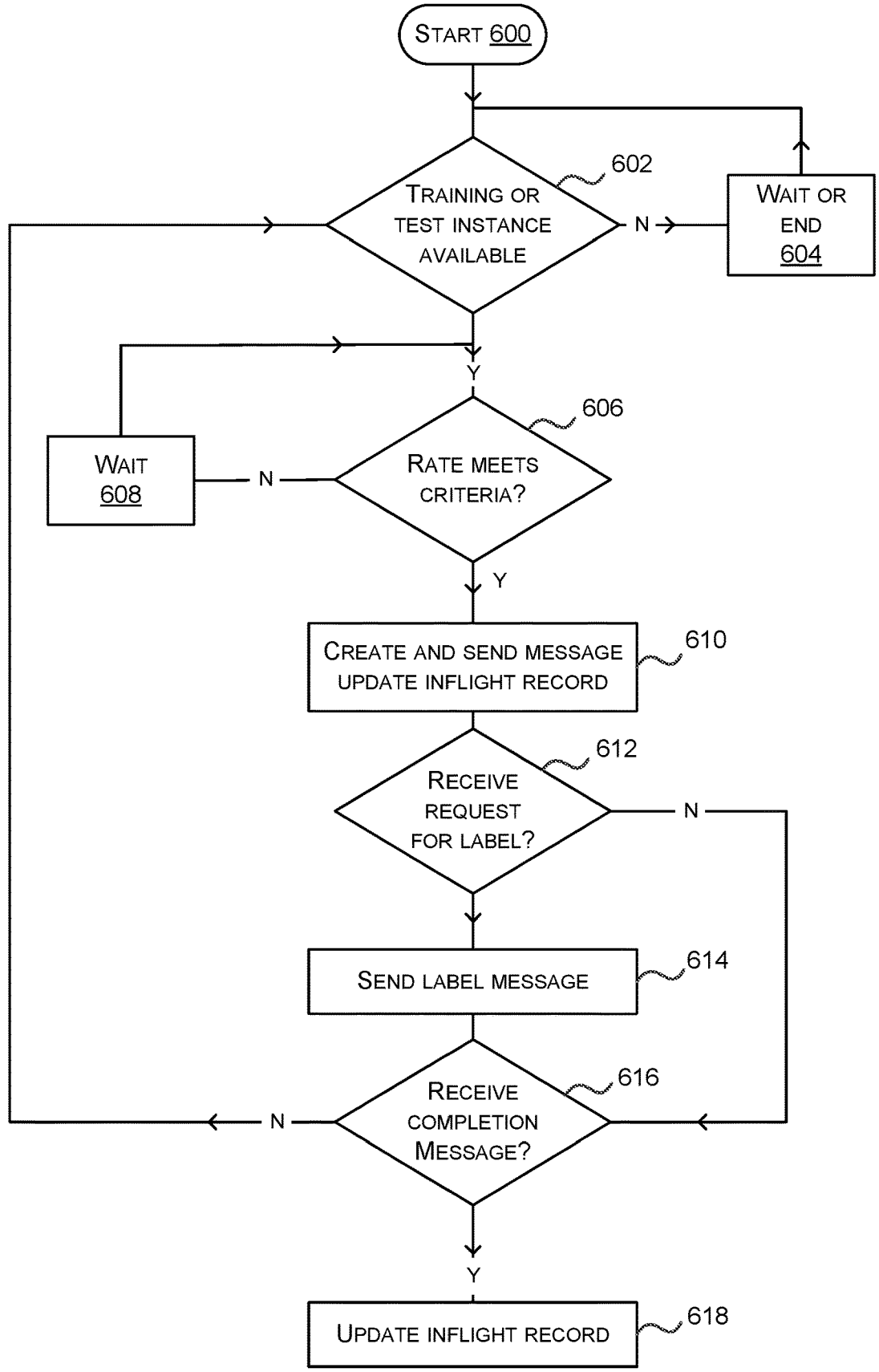
FIG. 6 is a flow diagram of a method of operation at a control node such as that of FIG. 2.

FIG. 6 is a flow diagram of a method at a control node, such as control node 200, of a distributed neural network training system. The control node begins operation and checks if a training or test data instance is available at check 602. If not the control node waits or ends 604. If a training or test instance is available the control node checks 606 if a rate of injection of data instances into the pipeline meets criteria. For example, an empirically determined range of rates of injection is found to give good performance and the control node seeks to use a rate within this range. In another example, the range of rates of injection is determined theoretically from data about the characteristics of the pipeline. In some cases the rate is dynamically adjusted according to one or more of: the number of in-flight instances in the pipeline, neural network architecture type, data instance features, observed worker node performance factors, observed communications network performance, pipeline features, and others.

If the training or test instance may be injected into the pipeline so that the rate will meet the criteria at check 606 then the control node creates and sends a message into the pipeline comprising the training or test instance; otherwise the control node waits 608. When the control node sends the message at operation 610 it updates a record of the number of instances which are in flight in the pipeline.

The control node checks, at the start of the process, whether the data instance is a training or a validation instance. If so, it sends a label message comprising the label of the training data instance to the worker node that contains the loss node of the computational graph.

The control node checks 616 whether it has received a completion message. If so, it decrements the record of the number of data instances which are inflight. The control node then returns to operation 602 and the process repeats.

Figure 7:
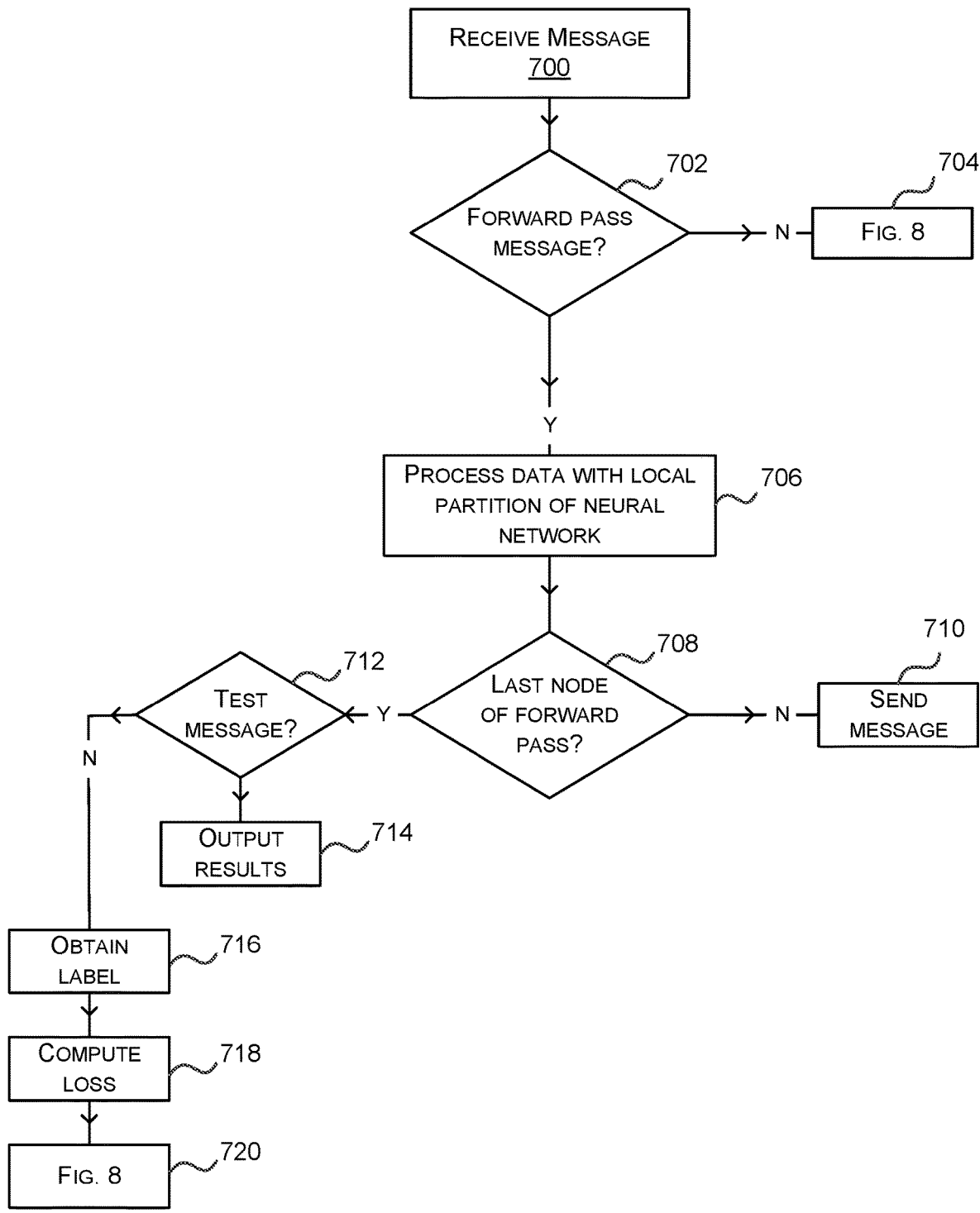
FIG. 7 is a flow diagram of a method of operation at a worker node during a forward process.

FIG. 7 is a flow diagram of a method of operation at a worker node of a pipeline such as that of FIG. 4 during a forward process. The node receives a message, either from the control node 200 or from an immediately preceding worker node of the pipeline. The node checks if the message is a forward pass message (that is, a message of the forward process) for example, by checking a flag in the message. If the message is not a forward pass message then the process of FIG. 8 is used as illustrated at box 704.

If the message is a forward pass message the data it contains is processed 706 using the subgraph of the neural network which is stored at the worker node (such as in fast memory 204). The worker node checks 708 whether it contains the loss node of the computational graph. If not, it sends 710 a message comprising the results of its processing to the next worker node in the pipeline. If the worker node contains the loss node of the computational graph it checks 712 a flag in the message it received at operation 700 to find out whether the message at operation 700 contains training data or a test data instance. If the message at operation 700 comprises a test data instance the worker node outputs the results of its computation at operation 714. These results comprise a prediction such as a class label of an image element of an image or a physical property of a molecule. The prediction is made available to a downstream process such as a gesture recognition system or a drug discovery system.

If the message at operation 700 comprises a training data instance the worker node obtains 716 a label of the training data instance from the control node 200. The worker node computes 718 a loss between the label and the prediction it computed at operation 706 and moves to the process of FIG. 8 at operation 720.

Figure 8:
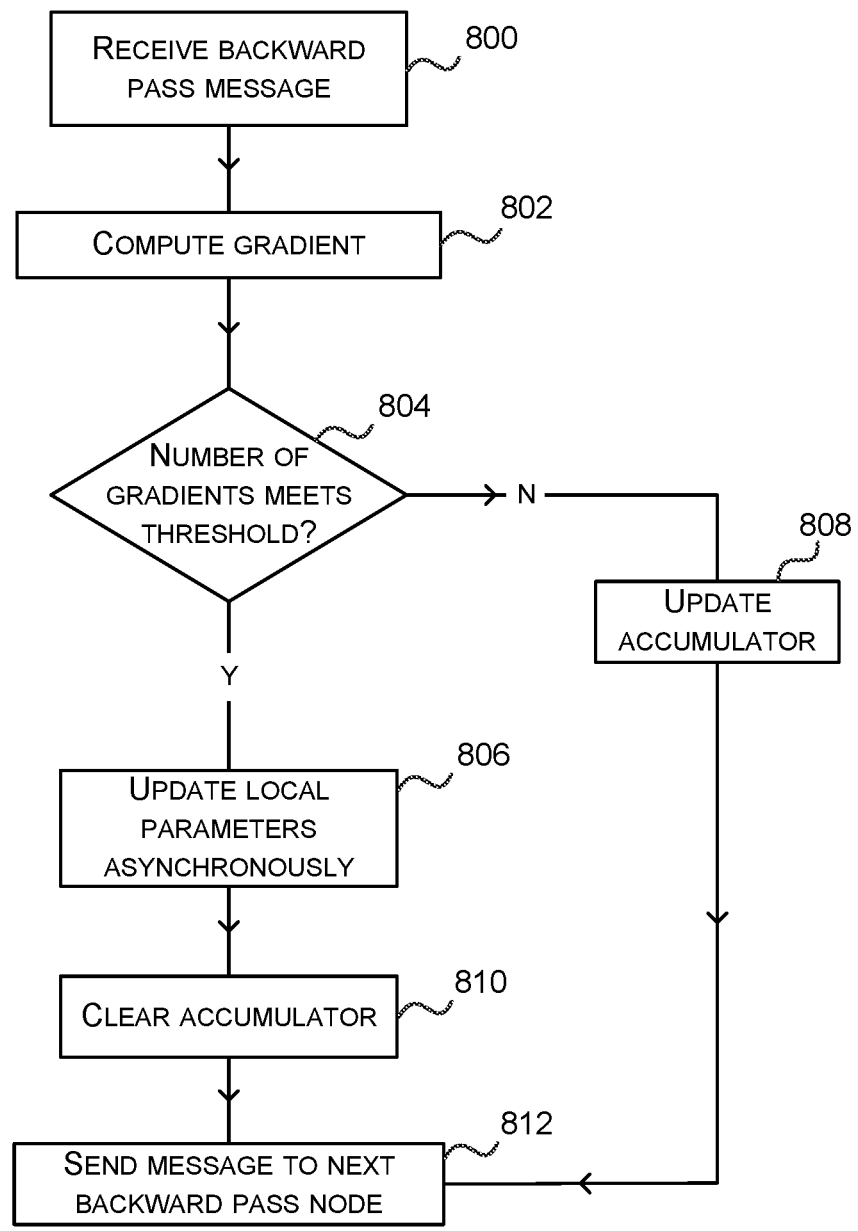
FIG. 8 is a flow diagram of a method of operation at a worker node during a backward process.

FIG. 8 is a flow diagram of a method of operation at a worker node of a pipeline such as that of FIG. 5 during a backward process. The worker node receives 800 a message during the backward process and is able to identify the message as being a backward pass message from a flag in the message. The backward pass message comprises results from the immediately subsequent worker node of the pipeline. The worker node computes 802 one or more gradients of a loss function with respect to (1) the message it received during the forward pass and (2) the parameters of the local subgraph. The gradients from (1) are put into a new backward message which is sent 812 to the next worker node of the backward process. The gradient(s) from (2) are added to an accumulator which is at the worker node. The worker node checks the number of gradients in the accumulator. If the number of gradients in the accumulator meets or exceeds a threshold at check 804 the worker node asynchronously updates 806 the parameters of the neural network subgraph at the worker node. It then clears 810 the accumulator. As mentioned above the threshold at operation 804 is either set globally for the pipeline as a whole or is set on a per-worker node basis. The threshold is dynamically adjusted in some cases according to observed data such as one or more of: behavior of the pipeline, characteristics of the input data, characteristics of the loss, characteristics of the neural network architecture, and others.

If the number of gradients at check 804 is below the threshold the gradients are stored 808 in the accumulator for later use.

Figure 9:
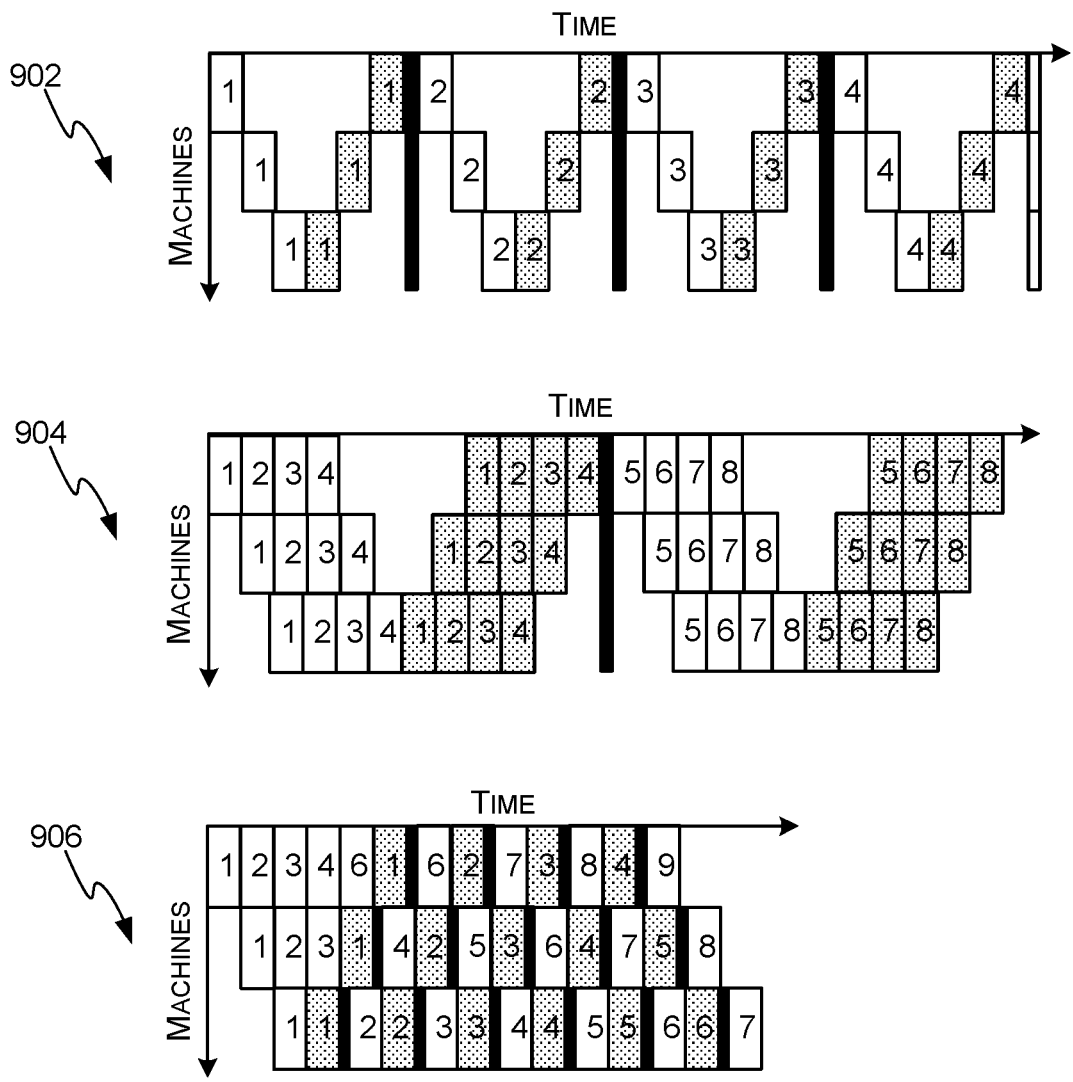
FIG. 9 is a schematic diagram of forward, backward and parameter update operations in the cases of three different types of neural network training schedule.

FIG. 9 is a schematic diagram of utilization of the pipeline in the case of asynchronous model parallelism (see graph 906 of FIG. 9) and in the case of two other scenarios (see graphs 902 and 904 of FIG. 9) which use synchronous updates and model parallelism. This diagram illustrates how asynchronous model parallelism gives significant efficiency gain as compared with alternatives. Graph 902 and 904 are both for scenarios with synchronous update of neural network parameters. In the case of graph 902 there is a maximum of one in flight data instance. In the case of graph 904 there is a maximum of four in flight data instances.

FIG. 9 is for the case where the pipeline comprises only three worker nodes (machines) as indicated on they axis of the graphs 902, 904, 906. At a first time instance, the first worker node of the pipeline processes data instance 1 in a forward process and this is indicated in FIG. 9 by the white rectangle labeled 1 at the origin of each graph. At a second time instance, the first worker node of the pipeline has finished processing data instance 1 and has passed the results for data instance 1 to the second worker node of the pipeline as indicated by the white rectangle labeled 1 at location 2, 2 in each graph. At the second time instance the first worker node is idle in the case of graph 902 and is working on a second data instance in the case of graphs 904 and 906. At a third time instance, the second worker node has finished processing the results from data instance 1 and has passed the results to the third worker node of the pipeline as indicated by the white rectangle at location 3, 3 in each graph. At the fourth time instant, in the case of graphs 906 and 902 the backward process now begins and grey rectangles indicate data instances being processed in the backward pass. In the case of graph 906 the parameters of the subgraph are asynchronously updated as indicated by the thin black rectangle at the end of time instant 4. In the case of graph 902 and 904 the parameters are updated simultaneously at each worker node after the forward and backward processes are complete. Also, the processes of graph 902 and 904 are less efficient than that of graph 906 since there is more white space, where white space indicates idle time of the relevant worker nodes of the pipeline.

Figure 10:
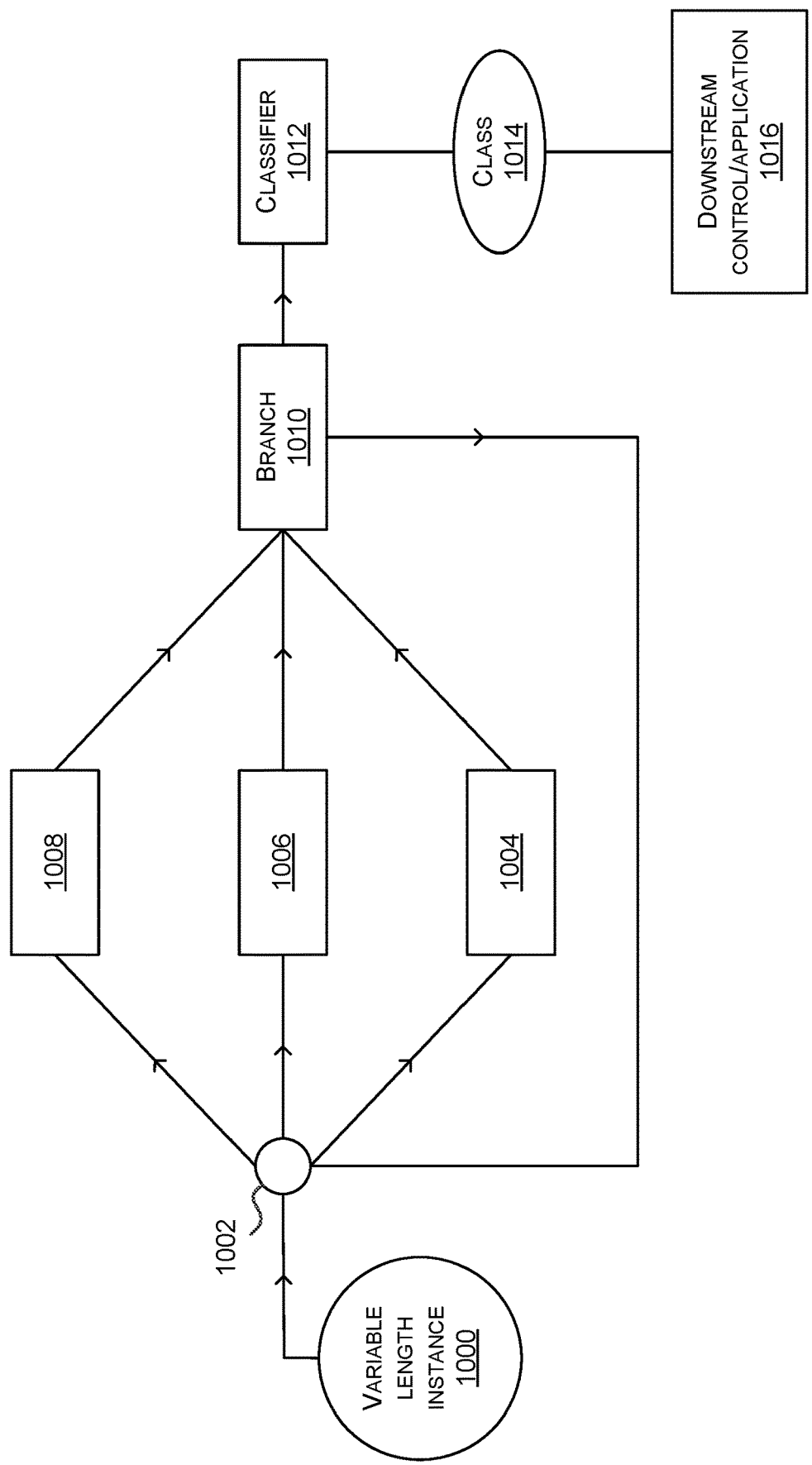
FIG. 10 is a schematic diagram of a variable length recurrent neural network.

FIG. 10 is a schematic diagram of a recurrent neural network configured to take as input text of different lengths as part of a sentiment analysis system. The neural network receives as input a sequence of words of variable length 1000 such as "I love cooking" or "I". The sentiment analysis system has been trained to predict either a positive or a negative sentiment class 1014 for an input text example. The class predictions are input to a downstream control system or application 1016 such as a content filter, a recommender system or other application. In order to allow for text of different lengths as input, the text "I love cooking" is input first as "I", the output is obtain and combined with "love" and input to the neural network; the output is obtained, combined with "cooking" and input to the neural network. The neural network may comprise only one neural network 1004 but it is likely to become over loaded due to the recurrence. To address this, additional neural network nodes 1006, 1008 are added which have replicas of the parameters of neural network node 1004. In some cases the individual neural network nodes 1004, 1006, 1008 are on different individual worker nodes.

The control flow path is different for the input text examples of different length. In the case of "I" as the input the neural network nodes 1006 are traversed and a branch decision at box 1010 decides whether the results are to be passed back to node 1002 and into neural network nodes 1008 or 1004. In the case of "I" the data proceeds without recurrence to classifier 1012 which is also a neural network in some cases, and a class is computed. In the case of "I love cooking" the results for "I" are passed back to node 1002, combined with "love" and input into neural network nodes 1004. The results for "I love" are passed back to neural network node 1002, combined with "cooking" and input into neural network nodes 1008. The branch neural network node 1010 outputs the results to classifier 1012 and a class 1014 is output. By using a graphical representation of the neural network of FIG. 10 which represents branch operation 1010 as a neural network node in its own right, the neural network architecture of FIG. 10 may be represented graphically and partitioned over a pipeline as described herein.

In some examples the neural network is an image processing system and the training data comprises labeled images. In this case there is a training apparatus for training an image processing system comprising: a network of worker nodes each having a memory storing a subgraph of a neural network to be trained; and a control node connected to the network of worker nodes; wherein the control node is configured to send labeled training images into the network to trigger parallelized message passing operations which implement a training algorithm which trains the neural network image processing system, and wherein at least some of the message passing operations asynchronously update parameters of individual subgraphs of the neural network at the individual worker nodes. For example, the image processing system once trained is able to recognize objects depicted in the images.

Figure 11:
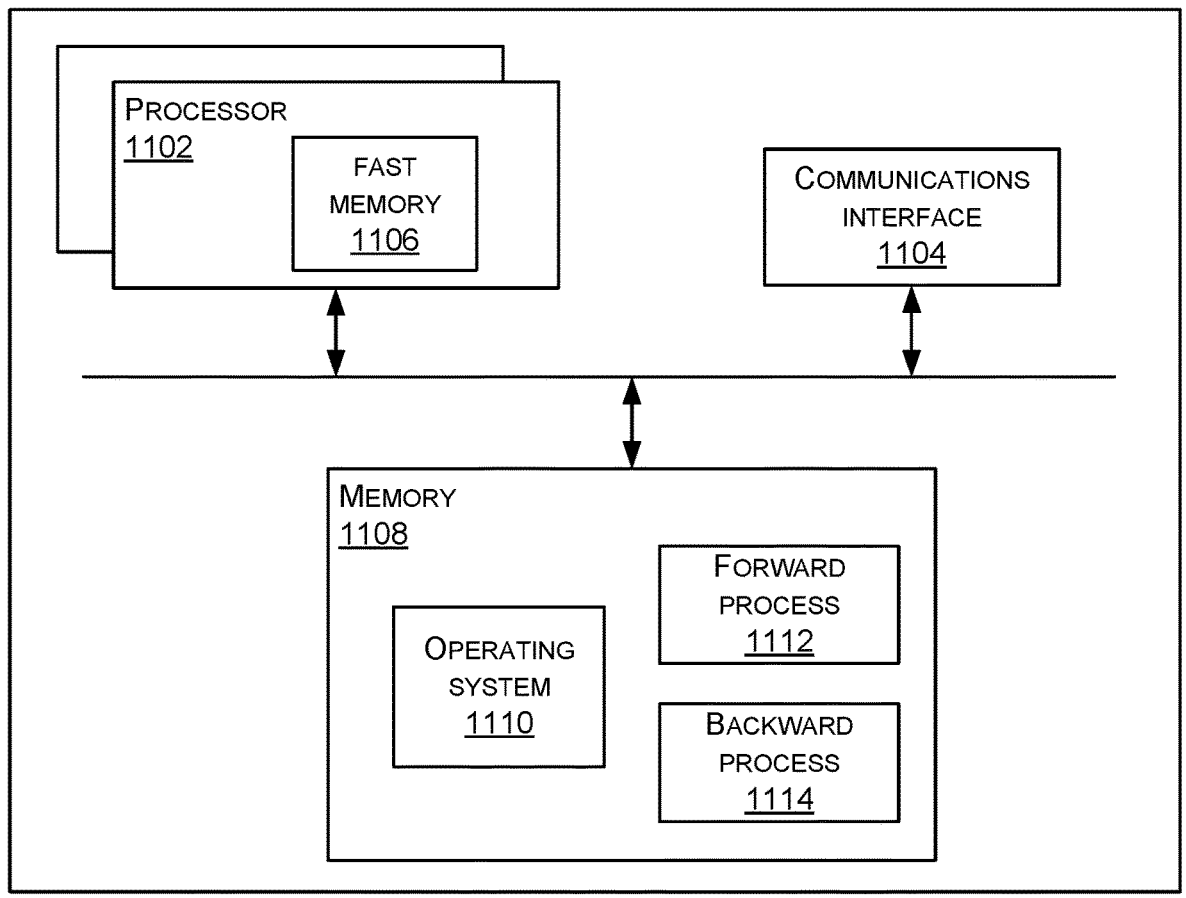
FIG. 11 illustrates an exemplary computing-based device in which embodiments of a worker node or control node are implemented.

FIG. 11 illustrates various components of an exemplary computing-based device 1100 which are implemented as any form of a computing and/or electronic device, and in which embodiments of a worker node w1 to w6 or a control node 200 are implemented in some examples.

Computing-based device 1100 comprises one or more processors 1102 which are microprocessors, controllers or any other suitable type of processors for processing computer executable instructions to control the operation of the device in order to train a neural network and/or process a data instance through a neural network. In some examples, for example where a system on a chip architecture is used, the processors 1102 include one or more fixed function blocks (also referred to as accelerators) which implement a part of the method of FIGS. 6 to 8 in hardware (rather than software or firmware). Platform software comprising an operating system 1110 or any other suitable platform software is provided at the computing-based device to enable software to be executed on the device such as for a forward process 1112 and/or a backward process 1114 of a distributed neural network training algorithm.

The computer executable instructions are provided using any computer-readable media that is accessible by computing based device 1100. Computer-readable media includes, for example, computer storage media such as memory 1100, fast memory 1106 storing a subgraph of a neural network and communications media. Fast memory 1106 is on-chip memory in some examples. In an example, fast memory 1106 is static random access memory (SRAM), or scratchpad memory. Computer storage media, such as memory 1108, comprises one or more of: dynamic random access memory (DRAM), hard disk drive (HDD), solid-state drive (SSD). The memory 1108 stores a dataset, control node functionality, and optionally, activation caches. Communication interface 1104 is a network card, port, or other means for connecting the computing-based device into a pipeline of a distributed neural network training system.

Combinations of one or more of the following examples are described.

A neural network training apparatus comprising:

a network of worker nodes each having a memory storing a subgraph of a neural network to be trained;

a control node connected to the network of worker nodes;

wherein the control node is configured to send training data instances into the network to trigger parallelized message passing operations which implement a training algorithm which trains the neural network, and wherein at least some of the message passing operations asynchronously update parameters of individual subgraphs of the neural network at the individual worker nodes.

The apparatus described above wherein the neural network has an architecture such the control flow is different for at least two different data instances processed by the neural network.

The apparatus described above wherein the control node is configured to keep a record of a number of training data instances which are in flight in the network of worker nodes.

The apparatus described above wherein the control node is configured to control a rate at which it sends training data instances into the network of worker nodes.

The apparatus described above wherein the control node is configured to control the rate on the basis of one or more of: the number of in-flight training data instances in the pipeline, neural network architecture type, data instance features, observed worker node performance factors, observed communications network performance, pipeline features.

The apparatus described above wherein the control node is configured to send test data instances into the network of worker nodes for processing by the neural network, concurrently with the training data instances.

The apparatus described above wherein the network of worker nodes is a pipeline.

The apparatus described above wherein the message passing operations triggered by the control node comprise a forward process and a backward process, wherein the forward process comprises forward messages sent from the control node along the pipeline to a terminal node of the pipeline and backward messages sent from the terminal node along the pipeline to the control node.

The apparatus described above wherein the worker nodes comprise on-chip memory and wherein the parameters of the individual subgraphs of the neural network at the individual worker nodes are stored in the on-chip memory.

A worker node of a neural network training apparatus comprising:

a memory storing a subgraph of a neural network; and a processor configured to asynchronously update parameters of the subgraph of the neural network stored in the memory according to at least one message received at the worker node from another worker node of a plurality of worker nodes of the apparatus over which a graph representing the neural network is partitioned.

The worker node described above wherein the memory is on-chip memory.

The worker node described above wherein the worker node comprises an accumulator which accumulates gradients computed by the worker node using data received in messages from the other worker node, and wherein the processor is configured to asynchronously update the parameters using the accumulated gradients when criteria are met.

The worker node described above wherein the criteria comprise one or more of: number of accumulated gradients, neural network architecture type, data instance features, observed worker node performance factors, observed communications network performance, subgraph factors.

The worker node described above wherein the criteria are bespoke to the individual worker node.

The worker node described above wherein the processor is configured to dynamically adjust the criteria.

The worker node described above wherein the worker node computes the gradients by computing gradients of a loss function comparing the neural network prediction and a label.

A pipeline comprising a plurality of worker nodes as defined in claim 16.

A computer implemented method at a worker node of a neural network training apparatus comprising:

storing, at a memory, a subgraph of a neural network;

receiving a message from another worker node of a plurality of worker nodes of the apparatus over which a graph representing the neural network is partitioned; and asynchronously updating parameters of the subgraph of the neural network stored in the memory according to the received message.

The method described above wherein updating the parameters according to the received message comprises computing at least one gradient of a loss function of the neural network using data in the received message.

The method described above comprising accumulating gradients computed by the worker node using data received in messages from the other worker node, and asynchronously updating the parameters using the accumulated gradients when criteria are met.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset). The term 'subgraph' means part but not all of a graph of interconnected nodes.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A neural network training apparatus comprising:
   a neural network of individual worker nodes each having a memory storing a subgraph of a neural network to be trained; and
   a control node connected to the network of individual worker nodes, wherein the control node invokes a different path through the network of individual worker nodes based on graphical structures of training data instances resulting in a dynamic pipeline;
   wherein the control node is configured to send the training data instances into the network to trigger parallelized message passing operations which implement a training algorithm which trains the neural network,
   wherein the individual worker nodes in the dynamic pipeline are can be used multiple times based on a graphical structure of an input data instance, including the graphical structures of the training data instances, sent into the network of individual worker nodes by the control node,
   wherein a path through the dynamic pipeline is different for at least two different input data instances with different graphical structures processed by the neural network, and
   wherein at least some of the message passing operations asynchronously update parameters of individual subgraphs of the neural network at the individual worker nodes based on calculating accumulated gradients obtained from the individual worker nodes in the dynamic pipeline that reduces a loss function corresponding to the individual worker nodes.

2. The apparatus of claim 1 wherein:
   the input data instance is a graphical structure of an organic molecule with rings of bonded atoms.

3. The apparatus of claim 1 wherein the control node is configured to keep a record of a number of training data instances which are in flight in the network of individual worker nodes.

4. The apparatus of claim 1 wherein the control node is configured to control a rate at which it sends training data instances into the network of individual worker nodes.

5. The apparatus of claim 4 wherein the control node is configured to control the rate on a basis of one or more of:
   a number of in-flight training data instances in the network of individual worker nodes, neural network architecture type, data instance features, observed worker node performance factors, observed communications network performance, pipeline features.

6. The apparatus of claim 1 wherein:
the control node is configured to send test data instances into the network of individual worker nodes for processing by the neural network, and
the test data instances and the training data instances are concurrently processed by the neural network.

7. The apparatus of claim 1 wherein the network of individual worker nodes is a pipeline.

8. The apparatus of claim 7 wherein the message passing operations triggered by the control node comprise a forward process and a backward process, wherein the forward process comprises forward messages sent from the control node along the network of individual worker nodes to a terminal node of the network of individual worker nodes and backward messages sent from the terminal node along the network of individual worker nodes to the control node.

9. The apparatus of claim 1 wherein the worker nodes comprise on-chip memory, and
wherein the parameters of the individual subgraphs of the neural network at the individual worker nodes are stored in the on-chip memory.

10. A worker node of a neural network training apparatus comprising:
a memory storing a subgraph of a neural network; and
a processor configured to asynchronously update parameters of the subgraph of the neural network stored in the memory according to at least one message received at the worker node from another worker node of a plurality of worker nodes of the apparatus based on calculating accumulated gradients obtained from the worker nodes that reduces a loss function corresponding to the worker nodes over which a graph of training data instances representing the neural network is partitioned,
wherein:
the plurality of worker nodes comprises a dynamic pipeline,
the worker nodes in the dynamic pipeline are used multiple times based on a graph of an input data instance, including the graph of the training data instances, sent into the neural network, and
a path through the dynamic pipeline is different for at least two different data instances with different graphs processed by the neural network.

11. The worker node of claim 10 wherein the memory is on-chip memory.

12. The worker node of claim 10 wherein the worker node comprises an accumulator which accumulates the gradients computed by the worker node using data received in messages from the other worker node, and wherein the processor is configured to asynchronously update the parameters using the accumulated gradients when criteria are met.

13. The worker node of claim 12 wherein the criteria comprise one or more of: number of accumulated gradients, neural network architecture type, data instance features, observed worker node performance factors, observed communications network performance, subgraph factors.

14. The worker node of claim 12 wherein the criteria are bespoke to the worker node.

15. The worker node of claim 12 wherein the processor is configured to dynamically adjust the criteria.

16. The worker node of claim 12 wherein the worker node computes the accumulated gradients by computing gradients of the loss function comparing a neural network prediction and a label received from a control node.

17. A pipeline comprising a plurality of worker nodes as defined in claim 16.

18. A computer implemented method at a worker node of a neural network training apparatus comprising:
storing, at a memory, a subgraph of a neural network;
receiving a message from another worker node of a plurality of worker nodes of the apparatus over which a graph of training data instances representing the neural network is partitioned, wherein the plurality of worker nodes comprises a dynamic pipeline; and
asynchronously updating parameters of the subgraph of the neural network stored in the memory according to the received message based on calculating accumulated gradients obtained from the worker nodes that reduces a loss function corresponding to the worker nodes,
wherein the worker nodes in the dynamic pipeline are used multiple times based on a graph of an input data instance, including the graph of the training data instances, sent into the neural network, and
wherein a path through the dynamic pipeline is different for at least two different data instances with different graphs processed by the neural network.

19. The method of claim 18 wherein updating the parameters according to the received message comprises computing at least one gradient of the loss function of the neural network using data in the received message.

20. The method of claim 18 further comprising accumulating the gradients computed by the worker node using data received in messages from the other worker node, and
asynchronously updating the parameters, based on the path through the dynamic pipeline, using the accumulated gradients when criteria are met.

* * * * *